United States Patent [19]

Wheatley et al.

[11] Patent Number: 4,486,831
[45] Date of Patent: Dec. 4, 1984

[54] MULTI-PROGRAMMING DATA PROCESSING SYSTEM PROCESS SUSPENSION

[75] Inventors: Nigel J. Wheatley, Broadstone; Martyn P. Andrews, Taplow, both of England

[73] Assignee: Plessey Overseas Limited, Ilford, England

[21] Appl. No.: 191,841

[22] Filed: Sep. 29, 1980

[30] Foreign Application Priority Data

Sep. 29, 1979 [GB] United Kingdom ............... 7933856

[51] Int. Cl.³ .................... G06F 9/18; G06F 11/00
[52] U.S. Cl. .......................................... 364/200
[58] Field of Search ... 364/200 MS File, 900 MS File

[56] References Cited

U.S. PATENT DOCUMENTS 4,121,286 10/1978 Venton et al. ............... 364/200

FOREIGN PATENT DOCUMENTS 1329721 9/1973 United Kingdom .
1410631 10/1975 United Kingdom .

OTHER PUBLICATIONS

K. J. Hamer-Hodges et al., *System 250-a Fault-Tolerant, Modular Processing System for Control Applications*, Systems Technology, Nov. 1977, No. 27, pp. 26–34.

*Primary Examiner*—Gareth D. Shaw
*Assistant Examiner*—Daniel K. Dorsey
*Attorney, Agent, or Firm*—Fleit, Jacobson, Cohn & Price

[57] ABSTRACT

Each process in a multi-process computing system using so-called capabilities may have associated with it a process dumpstack protected by the capability mechanism. The functions of this dumpstack are (i) to provide the state of the process at the point at which it was suspended and (ii) to stack (or nest) information relating to the invoked procedures (i.e. sub-routines) of the process. Thus there is a fixed sized portion containing principally the machine registers, the indicators and the watchdog timer values and a variable sized portion containing information related to each nested procedure. Each stack link is of fixed size and contains three items:- relativized instruction address, the code block capability and process capability pointer list block capability. This arrangement is enhanced to allow two additional classes of information to be stored in each link namely (a) an indication of the data and capability registers preserved during the domain change procedure and (b) descriptors for local storage segments. The use of descriptors for local storage allows a pool of storage particular to the process to be allocated on a segmented basis.

7 Claims, 10 Drawing Figures

MULTI-PROGRAMMING DATA PROCESSING SYSTEM PROCESS SUSPENSION

BACKGROUND OF THE INVENTION

The present invention relates to multi-programming data processing systems and is more particularly concerned with the arrangements provided to store the working parameters for a process when that process is interrupted (i.e. suspended).

To provide a system which is easily developed and maintained, the controlling suites of programs are divided into System Routines and Application Programs. Each Application Program deals with a limited set of tasks under the supervision of the System Routines.

In a real-time environment, where fast response times are necessary, any application program may be suspended to allow another program to begin processing a more urgent task. Each application program may be activated a number of times to deal with a sequence of similar tasks. Each activation, or so-called process, executes instructions from the common program but uses a separate working database. This results in a multi-programming system in which any number of processes may be in existence, one active and the rest suspended. System routines may run as processes, some of which can be suspended or re-activated and operated as CALLed routines.

To maintain the fast response, most or all the system routines and application programs are permanently resident within the fast-access memory. The remainder of the fast-access memory holds the permanent and dynamic data necessary for the programs to perform their tasks and the workspace associated with each process. Infrequently used programs and large but rarely accessed files may be held on backing store, to be brought into the fast-access memory when required. Each process is provided with a so-called process dump-stack in which are stored the working parameters of the process when the process is suspended.

Such a system is disclosed in Systems Technology issue 27 dated November 1977 in an article entitled "System 250—a fault tolerant modular processing system for control applications" by K. J. Hamer-Hodges and G. B. K. Stagg on pages 26 to 34. In such a system each process is restricted to making accesses to its own store or peripheral areas, so that any attempted violation immediately suspends that process and prevents corruption of information within the memory or peripheral. If an active process were allowed to write, in error, to an area of store holding the data base of another process or its parent instructions, the environment of this suspended process would be corrupted. When re-activated it would act on incorrect data or code and could corrupt other processes in turn. Thus the original error, if undetected, would be likely to propagate causing widespread damage. The system referred to in the article also prevents a process modifying its own instructions to allow re-entrant shared procedures, altering tables of constants, executing data as instructions and reading instructions as data since these imply program faults.

To create a secure environment for each process a store protection arrangement is used involving so-called "Capabilities". Each process is allocated certain blocks of memory which hold its instructions and data. Each block is defined in size and location by "Base" and "Limit" addresses and by an "Access" code which restricts the type of access which may be made to each block. A process is said to possess the Capability to make allowed accesses to each of these areas of store. The values currently in use are held in hardware capability registers and every store access is checked against violation. The capability handling operations are disclosed in B.P. Nos. 1,329,721 and 1,410,631. Each process is provided with pointer tables defining the storage blocks allocated to that process.

As mentioned previously each process in System 250 has associated with it a process dump-stack protected by the capability mechanism. The functions of this dump-stack are (i) to provide storage for the state of the process at the point at which it was suspended and (ii) to stack (or nest) information relating to the invoked procedures (i.e. sub-routines) of the process.

A process dump-stack therefore consists of a fixed portion containing principally the machine registers and indicators and a variable portion operated as a push-down stack having one entry (or link) for each nested routine (i.e. process or sub-routine). Typically the information stored in a link for each nested routine comprises (a) a relativised instruction address register value for the point of return to the nested routine, (b) the capability pointer for the code block of the nested routine and (c) the capability pointer for the pointer table of the nested routine.

It is an aim of the present invention to expand the facilities provided by the process dump-stack particularly relative to the push-down stack area links.

SUMMARY

According to the invention there is provided a multi-programming data processing system in which each process is provided with a process dump-stack having (a) a fixed portion for the storage of the contents of machine registers and indicators when the process is suspended and (b) a variable portion for the storage of links for each nested sub-routine performed by the process, in which each link includes information indicative of (a) the instruction address to which the process is to return when the nested routine is to be returned-to, (b) the code block of the nested routine and (c) a link descriptor indicative of the size and contents of the remainder of the link.

The incorporation of a link descriptor allows two additional classes of information to be stored in each link namely (i) data and capability registers preserved during the domain change procedure and (ii) descriptors for local storage segments. The descriptors for local storage segments contain sumcheck, base and limit information. Base and limit values here are relative to the base of the local store stack, which like the dump-stack is referenced by a hidden capability register C(L). The link descriptor is held in the most significant 8 bits of the IAR word. If this is zero then the link consists of three items only (i) the IAR, (ii) the code block and (iii) the process pointer block. The most significant bit of the primary descriptor indicates the existence of stacked registers and the least significant seven bits indicate the number of local store capabilities created.

Associated with a stacked register set is a one word descriptor which indicates the registers stacked when the sub-routine is nested.

Capabilities for segments of local storage are implemented by hardware instructions which are (i) a request local store instruction and (ii) a sub-set local store instruction.

Whenever local store segments are allocated by the instruction 'request local store' a three word entry is made in the process dump-stack. The entry contains a level number which indicates the current procedure nesting level and a certain amount of basic access information. Base and Limit values refer to the local storage stack and are relative to its base address. The pointer-field of the capability pointer is an offset relative to the base of the dump-stack. A similar mechanism allows capabilities for sub-sets of local store segments to be constructed. This is effected by the 'sub-set local store' instruction, which given the capability for a local store segment, will create a sub-set of that segment and return the capability for it in a register. The entry in the dump-stack is marked as a sub-set block and the associated level number relates to the current procedure nesting level.

While local store is allocated by an explicit hardware instruction it is de-allocated automatically when return is made from the procedure in whose link the entry is made. All capabilities of a specific level become inactive when that procedure level is returned from, this includes capabilities in registers.

The major function of the level number associated with each capability is to enforce the non-discretionary propagation control mechanism. This control ensures that no capability may be stored in a capability with a lower associated level. This security mechanism is vital if capabilities are to be prevented from referring to nonexistant or worse, superceded information.

Associated with the single "stacked registers" bit in the link descriptor is a one word register descriptor which indicates the registers stacked when the domain switching occurred (i.e. when the routine is nested). This register descriptor is set-up by the 'protected call' instruction and is used by 'return' and 'protected return' instructions, which enable automatic and selective definition of the domain interface.

In the 'protected call' instruction a data register (D0) is used as a register descriptor. The two functions of the descriptor are to indicate which data and capability registers are to be preserved during the call and which data and capability registers are to be cleared i.e. protected against being read by the new domain. The registers to be preserved are then loaded into the dump-stack link and the D0 register pattern is loaded into the register descriptor of that link.

In the 'protected return' instruction the register descriptor is used to define what registers are to be cleared on return to the calling routine.

BRIEF DESCRIPTION OF DRAWINGS

The invention will be more readily understood from the following description which should be read in conjunction with the accompanying drawings. Of the drawings:

FIG. 9 shows the flow diagram of a protected call instruction whereas

DETAILED DESCRIPTION OF DRAWINGS

Figure 1:
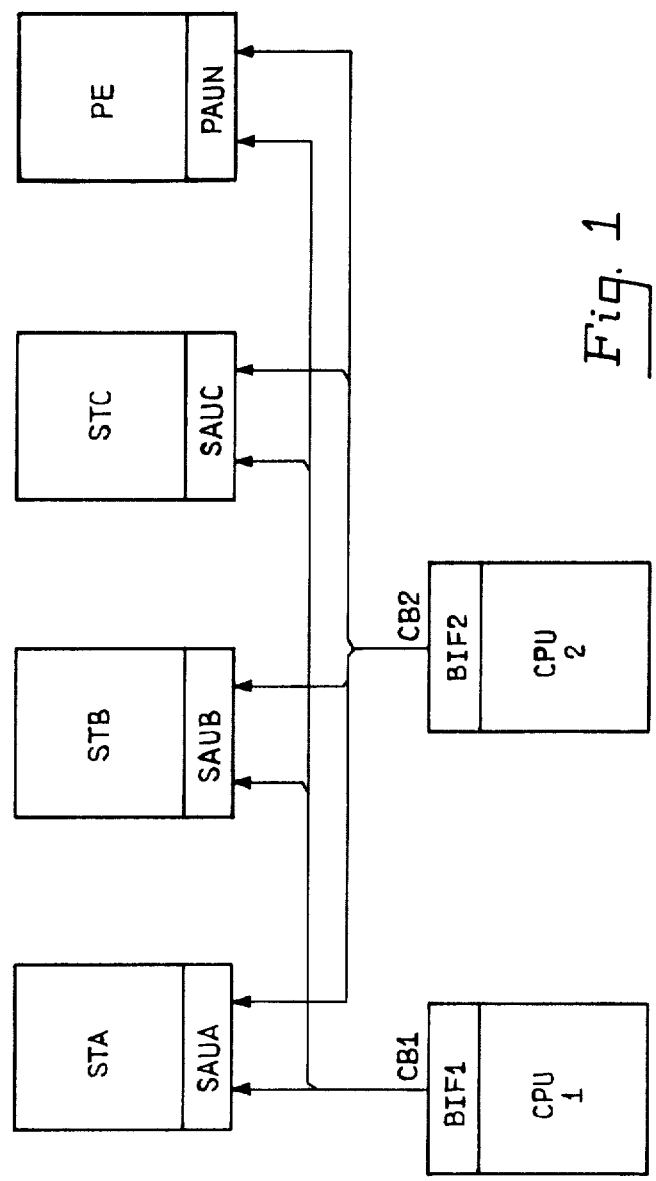
FIG. 1 shows a block diagram of a typical multiprocessor system for use with one embodiment of the invention.

Considering firstly FIG. 1, it will be seen that a modular data processing system is shown including (i) a number of processing units CPU1 and CPU2, (ii) a number of storage modules STA, STB and STC and (iii) a group of peripheral equipments collectively shown as PE. Each storage module and each peripheral equipment is provided with an access unit SAUA, SAUB, SAUC and PAUN.

Each processing unit is provided with a discrete communication path or bus (CB1 and CB2 respectively for processing units CPU1 and CPU2 via interfaces BIF1 and BIF2). Each bus is terminated upon a separate port of all the access units (SAUA, SAUB, SAUC and PAUN).

All the access units are provided with the facility of recognising coded address information when applied to the buses terminated on their input ports. The various segments used in the handling of processes are distributed throughout the storage modules and all addressing operations are based on the capability register protection system.

Figure 2:
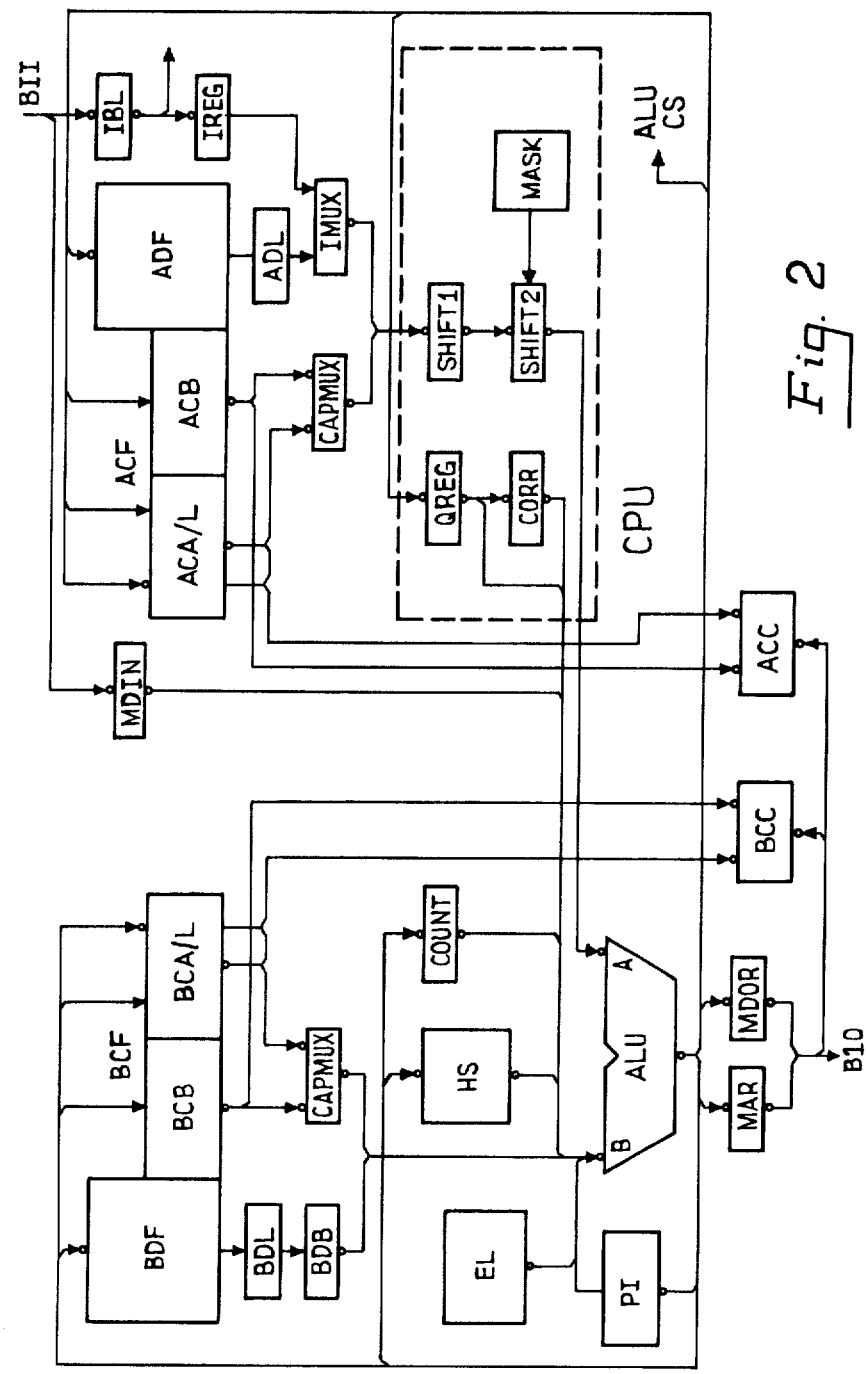
FIG. 2 shows in block diagram form a typical processor unit suitable for use in the embodiment of the invention.

Considering now FIG. 2, it will be seen that each processing unit CPU includes an A data file ADF and a B data file BDF each including 32 locations together with A and B capability register files ACF (ACA/L and ACB) and BCF (BCA/L and BCB). The capability registers are used to provide information protection arrangements of the type disclosed in B.P. Specification No. 1,329,721. The data files ADF and BDF provide duplicated register arrangements and each include eight general purpose registers.

Register Types

Figure 3:
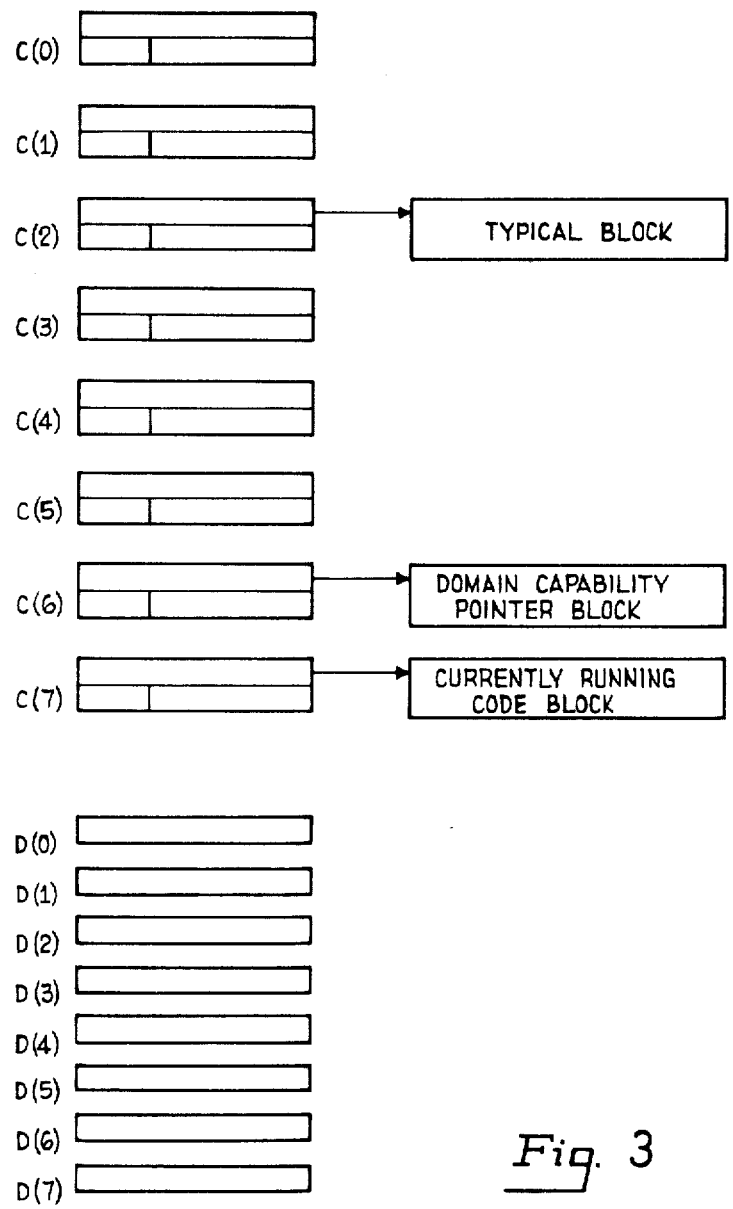
FIG. 3 shows the general purpose registers held in a register file in the processor unit.
Figure 4:
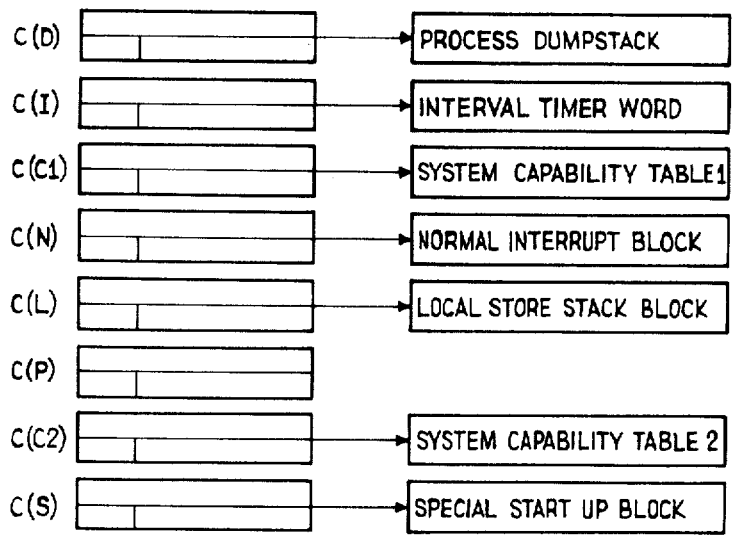
FIG. 4 shows the special purpose registers and the indicator registers in the processor unit.
Figure 4:
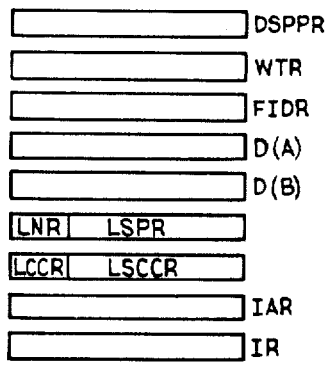
Figure 4:
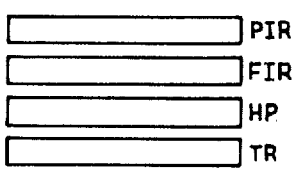

There are four types of registers namely Data Registers, Capability Pointer Registers, Capability Registers and Indicator Registers. Within the first three types, some are general purpose and are directly accessible to all programs. The others are special purpose registers used for specific functions and accessible only to programs possessing the appropriate capabilities. The complete register structure is illustrated in FIGS. 3 and 4.

General Purpose Data Registers (D(0) to D(7))

There are eight general purpose Data Registers, each 24 bits long, referred to as D(0) to D(7) in which all data manipulation is performed. Seven of these registers D(1) to D(7) may also be used as address modifiers during the formation of store addresses. Register D(0) is a Mask register and may be used to specify the required bits, when transferring part of a word to or from store. Register D(0) is also used to pass parameters from one instruction to another. Its use in this latter case will be more readily understood later.

General Purpose Capability Registers (C(0) to C(7))

When a Capability Register (referred to as C(0) to C(7)) is loaded it will contain a base address, limit address and access rights for a block in store.

Capability Register C(7) is used by the processor to hold the capability for the current program block, so that any instruction which loads a new capability into C(7) causes a transfer of control to the block defined by the loaded capability. Every time an instruction is read from the program block the processor checks that C(7) has an EXECUTE DATA bit set in its Primary Access Field andd that the address of the instruction lies between the Base and Limit addresses of the capability. If a capability is loaded into C(7) which does not have the EXECUTE DATA bit set, a Fault Interrupt is generated on subsequent use. Also if the instruction address lies outside the range of the Base and Limit, a Fault Interrupt is generated. Capability Register C(6) is generally used to reference the Domain Capability Pointer Block since it forms part of each link in the process dump-stack and is overwritten by the CALL and RETURN instructions.

Special Purpose Data Registers

The special purpose Data Registers are listed below.

1. Instruction Address Register (IAR)

This register contains the absolute address of the current instruction within the program block specified by the general purpose Capability Register C(7). It is altered by the CALL, RETURN and LOAD CAPABILITY C(7) instructions and changed by the CHANGE PROCESS instruction.

2. Watch-Dog Timer Register (WTR)

This register is changed by the CHANGE PROCESS instruction, the old value being saved in the process dump-stack of the suspended process; the new value is loaded from that of the activated process. It is decremented once every 100 μsec. If it reaches zero, a Fault Interrupt is caused (see Sect. 4). It therefore measures the total time each process is active.

3. Interrupt Accept Register (IR)

This register contains a single bit, bit 6, which is set when a Program Trap is accepted (see Sect. 4).

4. Process Dump-Stack Push-Down Register (DSPPR)

This register contains an absolute address pointer which defines the current top of the process dump-stack (i.e. it points to the first word in the area available for dumping). It is altered by the CALL RETURN, REQUEST LOCAL STORE, and SUB-SET LOCAL STORE instructions, and changed by a change process instruction.

5. Fault Indicator Dump Register

Following the first Fault Interrupt, this register contains the state of the Fault Indicator Register.

6. Level Number (LNR) and Local Store Stack Pointer Register (LSPR)

This register is divided into two parts. The most significant 8 bits contains the current link level number of the process. It is altered by the CALL and RETURN instructions, and changed by the change process instruction. The least significant 16 bits of the register contains a relative address pointer (relative to the Base of C(L)) which defines the current top of the Local Store Stack (i.e. it points to the first word in the area available for allocation). It is altered by the REQUEST LOCAL STORE, SUB-SET LOCAL STORE and RETURN instructions and changed by the change process instruction.

7. Local Capability Count (LCCR) and Local Store Clear Count Register (LSCCR)

The register is divided into two parts. The most significant 8 bits contain the count of the number of local capabilities created at the current link level. It is altered by the REQUEST LOCAL STORE and SUB-SET LOCAL STORE instructions, and changed by the CALL, RETURN and change process instructions. The least significant 16 bits if the register contain the local store clear count. It is altered by the REQUEST LOCAL STORE instruction and changed by the change process instruction.

8. Data Registers D(A) and D(B)

These registers are not used by any of the functions of the processor, but can be accessed by data instructions using 'Internal Mode'.

All the Special Purpose Data Registers are 24 bits long, with the exception of the Interrupt Accept Register. All of them can be accessed by data instruction using 'Internal Mode' as well as being accessed by specific instructions.

SPECIAL PURPOSE CAPABILITY REGISTERS

There are eight special purpose Capability Registers, which are used by the processor unit to access control information. They can be read and altered by programs which have the capability of addressing in 'Internal Mode' since special loading instructions are not provided.

1. Capability Register C(D)

This register contains Base/Limit Addresses and Access code for the processor dump-stack of the active process. It is changed by the change process instruction and manipulated by the CALL, RETURN, REQUEST LOCAL STORE and SUB-SET LOCAL STORE instructions.

2. Capability Registers C(I)

This register defines a block of store the first word of which contains the Interval Timer value. It measures the absolute time elapsed and it is decremented once every 100 μsec by the processor unit. When it reaches zero, a Normal Interrupt is generated.

3. Capability Register C(C1)

This register defines a block of store containing the first part of the System Capability Table.

4. Capability Register C(C2)

This register defines a block of store containing the second part of the System Capability Table.

5. Capability Register C(N)

This register defines a block of store the first word of which contains a Capability Pointer which permits entry to the Normal Interrupt process.

6. Capability Register C(S)

This register defines a four word block of store which is used by the processor when dealing with Fault Interrupts. The twelve most significant bits of the Base word are incremented during the fault sequence, the remainder of the register being present by the processor following power-up.

7. Capability Register C(L)

This register defines a block of store for the Local Store Stack of the current process. It is changed by the change process instruction.

8. Capability Register C(P)

This register is used by the Programmer Interface when accessing store.

INDICATOR REGISTERS

There are four Indicator Registers: Primary Indicator (PIR FIG. 2 and FIG. 4), Fault Indicator FIR, Test TR and Historical HR register. They indicate various conditions within the processor. They are accessible in Internal Mode only. The contents of the Primary Indicator Register is changed by a change process instruction; the old value is saved in the process dump-stack of the suspended process and then the new value is loaded from that of the activated process.

Primary Indicator Register (PIR)

The Primary Indicator Register is eight bits long.

Bits 0–2 are Arithmetic Indicators: EQUAL TO ZERO, (bit 0), LESS THAN ZERO, (bit 1), OVERFLOW, (bit 2). They are set or cleared by the result of the majority of instructions.

Bits 4 and 5 are Control Indicators:

1. SPECIAL MODE (bit 4) remains set for one instruction only. When set, it either allows a LOAD CAPABILITY instruction to access special purpose Capability Register in place of the corresponding general purpose Capability Register.
2. INTERFACE FAULTS INHIBIT (bit 5) remains set for one instruction only. When set, it inhibits the Fault Interrupt which would normally be caused if an operand fetch from store detected a Processor/Store Interface Fault.

Bit 7 is FIRST ATTEMPT Indicator. It is set by a Fault Interrupt and affects the Processor's response to subsequent faults.

Bit 8 is the INHIBIT INTERRUPTS Indicator. It inhibits timer interrupts from taking place when set.

Fault Indicator Register (FIR)

The Fault Indicator Register is 24 bits long. Any bit may be set by an Internal Mode Access; any bit may be cleared. When set by the events described below, a Fault Interrupt occurs, excepting Processor/Store Interface Faults when INTERFACE FAULTS INHIBIT is set in the Primary Indicator Register.

Bits 0, 5, 9–11 and 14 indicate Processor/Store faults:

BUS CORRUPT (bit 0) is set if any of the input lines from the parallel bus have not returned to logic '0' within 400 μsec after a store access.

SLAVE TIMEOUT (bit 5) is set if a store module reports that address or data cannot be accepted by the module during a store access.

STORE INTERFACE TIMEOUT (bit 9) is set if a store module has not responded within 50 μsec.

PARITY COMPARISON FAULT (bit 10) is set if the parity generated by the store module on a forward-going word (i.e. 'address' or 'address/data') and returned to the CPU, is not equivalent to that generated by the processor.

READ DATA PARITY FAULT (bit 11) is set if the 'data/address' parity read from store is not equivalent to that generated by the processor on the address and data from store.

INVALID CONTROL CODE (bit 14) is set if a store module reports that it has received an invalid control code during a CPU/Store transfer. Three bit, odd parity codes are used.

Bit 2 is the INTERRUPT TIMEOUT Indicator. It is set if the Interrupt Accept Register has not been accessed, following the Interval Timer Word being decremented to zero (when INHIBIT INTERRUPTS is not set), for a period of 300 ms, or if this condition has not occurred 300 ms after a Fault Interrupt.

Bits 6–8 and 18 indicate Capability faults:

CAPABILITY COMPARISON FAULT (bit 6) is set if the duplicated Base Address, Limit Address or Access Code within a Capability Register being used by an attempted access are found not to be identical.

CAPABILITY SUMCHECK FAULT (bit 7) is set if the Sumcheck word, circulated left by 9 bits, does not agree with the sum of Base and Limit values when a Capability Register is being loaded.

CAPABILITY BASE/LIMIT VIOLATION (bit 8) is set if an address is found to be outside the range specified by the Base and Limit Addresses of the Capability being used.

ACCESS FIELD VIOLATION (bit 18) is set if an illegal transfer is attempted.

Bit 12 is the INVALID OPERATION Indicator. It is set whenever an invalid operation is attempted.

Bit 13 is the POWER FAILURE Indicator. It is set if the power supply margins are exceeded.

Bit 15 is the TRAP FAULT Indicator. It is set if a Program Trap occurs while INHIBIT INTERRUPTS is set.

Bits 16 and 19 indicate Hardware Faults. HARDWARE FAULT 1 and HARDWARE FAULT 2 are set if certain internal hardware checks fail.

Bit 17 is the WATCHDOG TIMER ZERO Indicator. It is set if the Watchdog Timer Register reaches zero.

Bits 20–23 are set to the octal address of the Capability Register being used when a Fault or Trap occurs.

Bits 3 and 4 can only be set/reset by data instructions using 'Internal Mode'.

Test Register (TR)

This register contains control facilities for testing the fault detection mechanisms.

Historical Register (HR)

One register of a group of sixteen 26 bit registers is addressable at a time, by a 4 bit address counter. They constitute a First-In/First-Out circular queue for use on fault investigative routines.

The use of the above registers together with the bit multiplexer BM, the arithmetic unit ALU, the instruction register IREG, the data in register MDIN the memory address register MAR, the data out register MDOR and the A and B Capability check comparators ACC and BCC all shown in FIG. 2 will be more readily seen later with reference to the operation of the processor in the execution of the instructions which manipulate the information in the process dump-stack.

Process Dump-Stack

Each process has associated with it a Process dump-stack which is a block of store defined by the special purpose Capability Register C(D) while the process is running. The process dump-stack has three functions:

1. To preserve the processes environment while suspended;
2. To stack subroutine environment values during a CALL to another subroutine;
3. To act as a Local Capability Table for blocks of Local Store allocated on the Local Store Stack.

Figure 5:
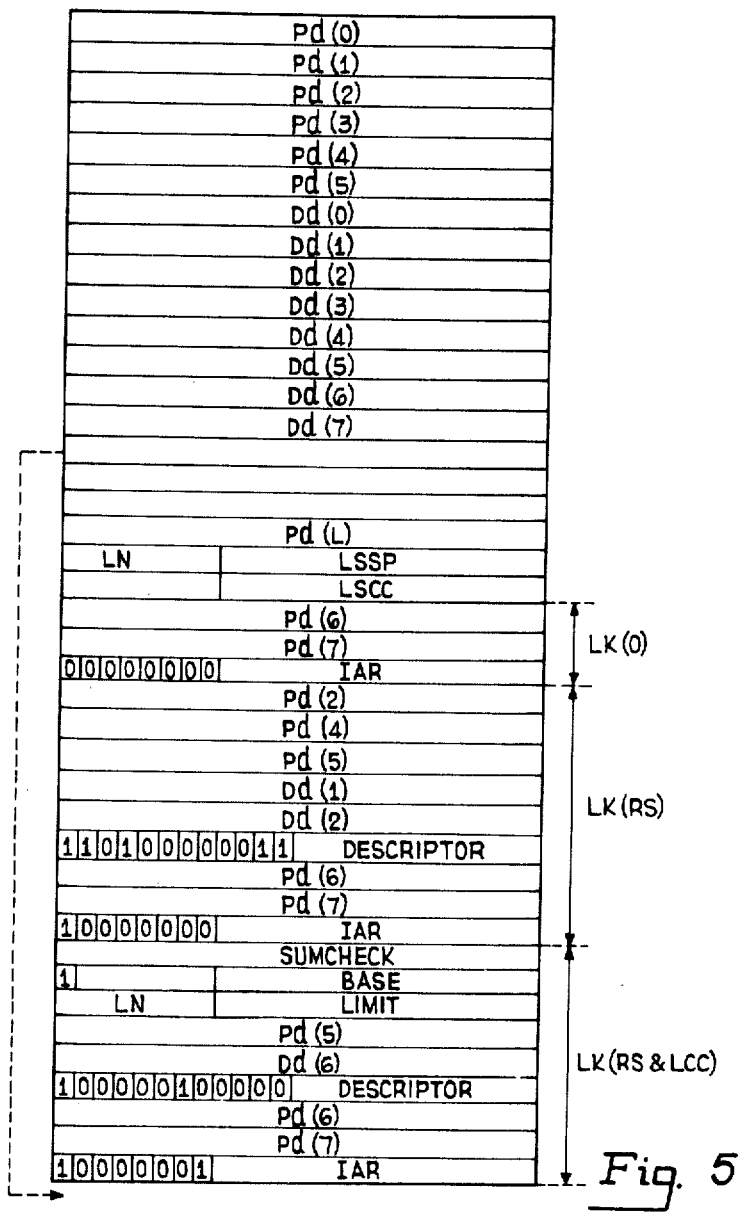
FIG. 5 shows a typical dump-stack.

The process dump-stack is updated by the instructions CALL, REQUEST LOCAL STORE, SUB-SET LOCAL STORE and change process. The change process instruction involves two such stacks. The contents of a typical current process dump-stack are shown in FIG. 5.

The process dump-stack comprises a fixed sized area and a stack area. The fixed area is used to dump the processes environment on suspension. During a change process micro-sequence the capability pointers from the Capability Pointer Registers P(0) to P(5) are dumped into locations Pd(0) to Pd(5) and the contents of Data Registers D(0) to D(7) are dumped into locations Dd(0) to Dd(7). In addition a number of special process values are dumped into the fixed area. These are the Pushdown Register, the Watch-Dog Timer, the Primary Indicator Register, the Level Number (LN) and Local Store Stack Pointer Register (LSSP) and the Local Store Clear Count Register (LSCC). The capability pointers from the Capability Pointer Registers P(6) and P(7) together with the current (relative) Instruction Address Register and the Local Capability Count Register are dumped onto the stack.

The Pushdown Pointer Register, when dumped in the Pushdown Pointer location during a change process, points to the last word written to the dump-stack (i.e. the Instruction Address). When the process is running this register points to the top of the stack (i.e. the next available location on the stack). During a CALL Data Registers D(1) to D(6) and Capability Pointer Registers P(0) to P(5) may be preserved by specification in the instruction, and in this case a Descriptor value indicates which registers have been stacked as follows:
Bits 18-23  P(0)-P(5)
Bits 12-17  D(1)-D(6)

A setting of the specific bit to 1 indicates the register is to be stacked. The Capability Pointer Registers P(6) and P(7) are always preserved on CALL together with the Instruction Address Register (relative) for the next instruction to be obeyed. A setting of one for the most significant bit in the IAR word indicates that registers are stacked.

Figure 6:
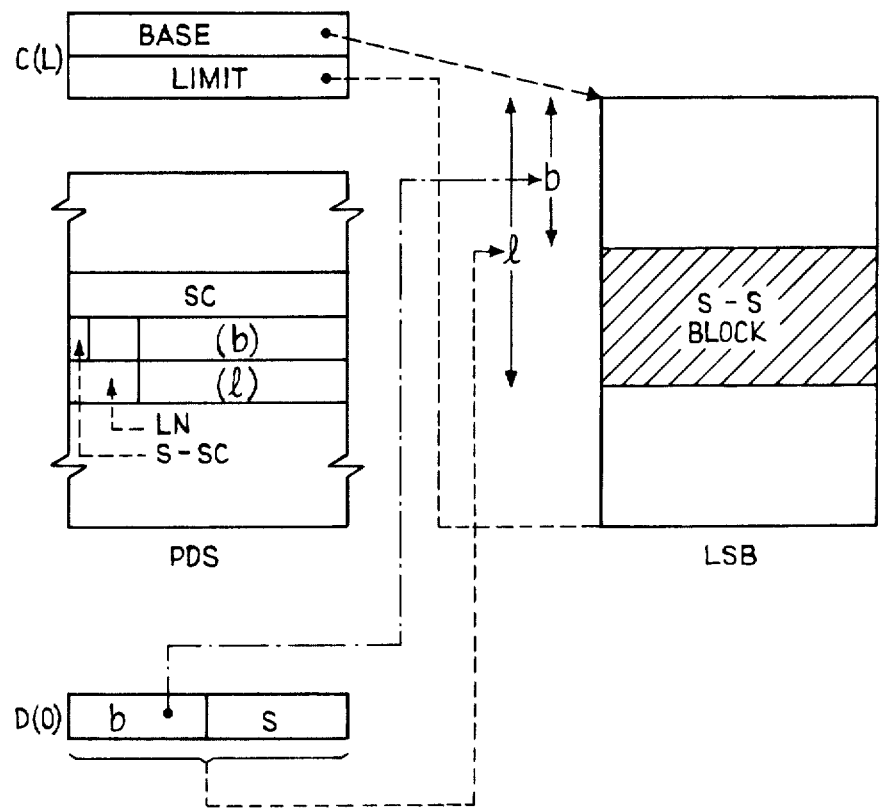
FIG. 6 shows the local capability format.

Whenever local store is allocated on the Local Store Stack by the REQUEST LOCAL STORE instruction or a sub-block is defined by the SUB-SET STORE instruction a three word entry is made on the process dump-stack. The three word entry comprises a Sumcheck word, a Base word and a Limit word. The least significant 16 bits of the Base word contain an offset, relative to the base of the Local Store Stack Capability Register, C(L), of the first location of the specified block. Bit 23 of the Base word contains the SUB-CAPABILITY bit. The least significant 16 bits of the Limit word contain an offset, relative to the base of the Local Store Stack Capability Register, C(L), of the last location of the specified block. The most significant 8 bits of the Limit word contain the level number at which the Local Capability Table Entry was created. The Sumcheck word contains a 24 bit check word formed by adding the least significant 16 bits of the Base word to the least significant 16 bits of the Limit word. The format of a Local Capability Table entry is shown in FIG. 6.

The REQUEST LOCAL STORE instruction creates local Capability Table entries with the Sub-Capability bit reset, whereas the SUB-SET LOCAL STORE instruction creates local capability table entries with the Sub-Capability bit set.

Consideration will now be given to the performance of the processing unit of FIG. 2 in the execution of the various instructions which manipulate the information held in a process dump stack. The various operations performed by the processing unit are controlled by a micro-program control unit not shown in the drawings but it will readily be appreciated by those skilled in the art that the required operations defined by the flow diagrams of FIGS. 7 to 10 can be interpreted for example using programmed read only memories generating the required control signals for each flow diagram step. Throughout the following description various register to register transfers occur and to simplify the disclosure a shorthand notation involving the symbol := will be used. This symbol should be read as defining "becomes" so that the statement ALU := MDIN should be read as the arithmetic unit (ALU) accepts the data held in the data in register MDIN.

Figure 7:
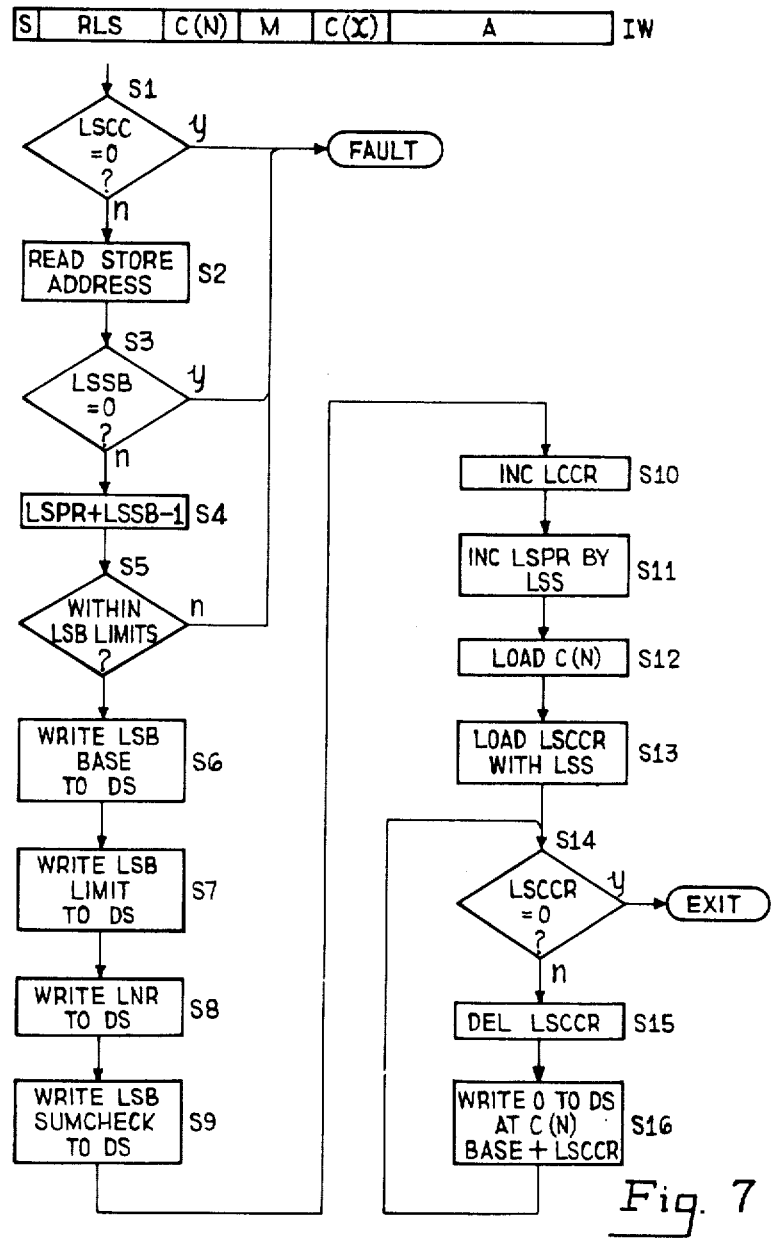
FIG. 7 shows the flow diagram of a request local store instruction.

The first instruction to be considered is "Request Local Store" and the flow diagram for that instruction is shown in FIG. 7.

Request Local Store Instruction

At the top of FIG. 7 the instruction word IW is shown indicating that this instruction (RLS) is performed in store mode (S) and requires a local store block to be allocated of a size indicated by the data held in the store location defined by the M, C(x) and A fields of the instruction word and the capability descriptor for that local store block to be loaded into capability register C(N). The M field defines one of the data registers to act as an address modifier whereas the C(x) field defines the general purpose capability register holding the descriptor for the block in which the required store location is held and the A value defines the offset from the base of that block for the required location. During the previous instruction cycle the instruction word IW is read from store into the instruction buffer 1B in FIG. 2 and the function code and register selection fields are applied to the microprogram store (not shown) to start this instruction operation which is performed by the following sequence of steps under microprogram control.

Step S1 LSCC=0?

In this step the local store clear count register LSCCR is selected by the microprogram unit in the A file and fed to the arithmetic unit ALU so that the microprogram unit can test the arithmetic unit control signals AUCS for zero. If it is zero there is no available space in the local store. If it is not zero step S2 is performed.

Step S2—READ STORE ADDRESS

In this step the store address defined by the A value of the instruction word is read from the relevant store module into the data input register. Typically the sequence of operations performed in this step will be as follows:
ALUb := C(X) BASE
ALUa := IREG (A Value)
ALU Add
MAR := ALU
Store read @ MAR
MDIN := BIN It should be noted that it has been assumed that no address modification was required (i.e. M=0). The above operation has extracted the local store block size value LSSB to be read from the relevant store module into the data in register MDIN.

Step S3—LSSB=0?

In this step the data read in step S2 is passed to the ALU for testing for zero by the microprogram unit using the ALUCS signals. If it is zero a fault is indicated, if it is not step S4 is performed.

Step S4—LSPR+LSSB−1

In this step the local store stack pointer register (LSPR) is read to define the current top of the local store stack (i.e. the first word in the area available for allocation) and the last (or limit) address for the block request is calculated by adding the LSSB value read in Step S2 minus one to the current LSPR address. Typically the sequence involves the following operation ALUa := LSPR
ALUb := MDIN−1
SAVE ALU

Step S5 Within LSB Limits

In this step the result of the step S4 operation is tested to see if the requested block will overrun the local store area. This is achieved by selecting the limit half of the local store capability register C(L) and comparing it with the result from the ALU in the capability comparators ACC and BCC. If the test fails a fault is generated.

Step S6 WRITE LSB BASE TO DS

In this step the dump-stack push-down pointer register DSPPR currently pointing to the top of the dump-stack is used to define the address into which the base address for the requested local store block is to be written. Reference to FIG. 5 in the area referenced LK (RS&LCC) indicating "link having registers stacked and local capability created" shows a local store capability entry consisting of SUMCHECK, BASE and LIMIT.

The operations performed typically may take the following sequence:

ALU := DSPPR
ALU+1
MAR := ALU
DSPPR := ALU
ALU := LSPR
MDOR := ALU
Store Write @ MAR

Step S7—Write LSB LIMIT TO DS

In this step the limit value for the local store block being requested is written into the local store capability entry by performing the following operations;

ALU := DSPPR
ALU+1
MAR := ALU
DSPPR := ALU
ALU := LSS−1+LSP
MDOR := ALU
Store Write @ MAR

Step S8—Write LNR to DS

In this step the contents of the level number register LNR are written into the eight most significant bits of the LIMIT word entry addressed in Step S7 by the following:

ALU := LNR
MDOR := ALY
Store Write @ MAR

Step S9—Write SUMCHECK to DS

In this step the sumcheck for the local store capability entry is formed and written to the first word of the local store capability entry.

ALUa := DSPPR
ALUb := LSS−1+LSP
ALU add
BM right circulate
ALU := BM
MDOR := ALU
ALU := DSPPR
ALU minus 2
MAR := ALU
Store Write @ MAR

Step S10—INC LCCR

In this step the value in the local capability count register LCCR is incremented by one. Typically this is achieved by circulating the contents of the LCCR register through the ALU and operating the ALU for a+1 operation.

Step S11—INC LSPR by LSS

In this step the local store block size information read in step S2 is added to the current value of the local store pointer register LSPR to form a new pointer to the next free area in the local store.

Step S12—LOAD C(N)

In this step the local capability descriptor formed above is loaded into the capability register defined by the 'D' field of the instruction word. Typically the operations performed involve a normal load capability register operation which will be similar to the actions described in B.P. No. 1,329,721 taking into account the difference in design between the two CPU's.

Step S13—LOAD LSCCR with LSS

In this step the local store size value read in step S2 is fed into the local store clear count register and steps S14, 15 and 16 are then performed repetitively to clear the locations in the local store block which have been requested. This is achieved by decrementing the local store clear count register (Step S15) adding it to the C(N) base value and writing 0's to the store location so defined (Step S16) and then testing the local store clear count value for zero (Step S14).

When all the local store block locations have been cleared the LSCCR value will be zero and the instruction will exit at step S14.

From the above it can be seen that the local store block defined by the local capability entry in the dump-stack link LK(RS&LCC) of FIG. 5 can now be used by the current routine and that the creation of the local store block has been recorded in the local capability count register LCCR.

Figure 8:
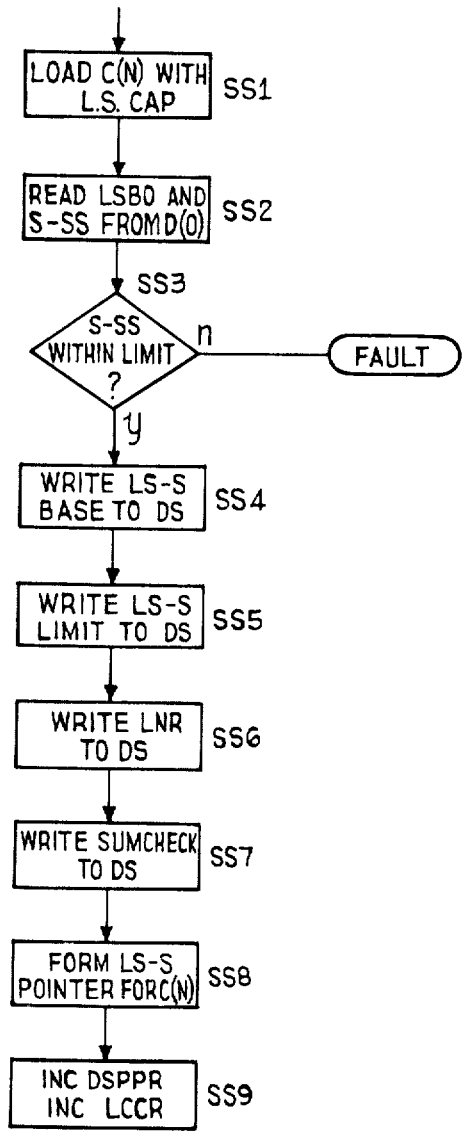
FIG. 8 shows the flow diagram of a sub-set local store instruction.

Consideration will now be given to the "sub-set local store" instruction and the flow diagram for that instruction is shown in FIG. 8.

Sub-set local store instruction

In this instruction the instruction word, shown at the top of FIG. 8 and referenced IWS-S, defines the capability pointer for the local store capability descriptor by way of the C(x) and A fields and the capability register to be loaded with the local store capability descriptor. The instruction is also entered with data register D(0)

holding, in its 12 most significant bits, an offset and, in its least significant 12 bits, a sub-set word size value.

Step SS1—LOAD C(N)

In this step the capability register specified by the D field C(N)) is loaded with the local store capability descriptor defined by the pointer specified by the M, C and A fields. Typically the operations performed relate to those performed in B.P. No. 1,329,721 with adjustments of course to accommodate the change in design of the CPU from that disclosure to this.

Step SS2—Read LSBO and Size

In this step the offset value and size are used to define the area required for the sub-set in the local store to define an address indicative of the limit of the sub-set within the local store block. These operations typically may be achieved by the following sequence.

ALUa bits 0-11 := D(0) bits 11-24
ALUb := C(N) Base
ALU add
MDOR := ALU
D(x) := ALU
ALUa := D(x)
ALUb := D(0) bits 0-11
ALU add

Step SS3—S-SS within Limit

In this step the limit address formed by the last ALU add operation is tested against the limit for the local store capability descriptor by using the capability code comparators ACC and BCC. If the limit address is outside the size of the local store block a fault is indicated, if it is not step SS4 is performed.

Step SS4—WRITE LS-S BASE TO DS

In this step the result of the addition of the offset and the relative base from the capability register specified by the instruction D fields (i.e. C(N)), currently stored in the data-out register during step SS2, dump-stack to form the base word for the local capability entry with bit 23 set to indicate that it is a sub-set descriptor. Typically the micro-program unit will cause the following sequence to be performed.

ALUa: = DSPPR
ALU add 1
MAR := DSPPR
Store Write @ MAR

Step SS5—WRITE LS-S LIMIT TO DS

In this step the limit value of the local capability descriptor for the sub-set is written to the dump-stack at the next location therein.

Step SS6—WRITE LNR TO DS

In this step the value in the level number register LNR is written into the eight most significant bits of the entry written-to in step SS5.

Step SS7-WRITE SUMCHECK TO DS

In this step the base address for the sub-set block is added to the limit address and the result rotated by 9 bits and this word is then written to the dump-stack address specified by the dump-stack pushdown pointer register DSPPR to form the sumcheck entry for the local capability descriptor.

Step SS8—FORM LS-S POINTER FOR C(N)

In this step the capability register specified by the C(N) field is accessed and the 9 most significant bits of the limit word extracted to form the pointer for C(N) using the least significant 15 bits of the relative value of the process dump-stack pushdown pointer register.

Step SS9—INC DSPPR; INC LCCR

In this step the process dump-stack pushdown pointer register DSPPR contents are incremented to point to the dump-stack location "below" the limit word of the last formed capability descriptor. Finally the logic capability count register LCCR contents are incremented by one to indicate the number of local capability descriptors created by the process.

From the above description of the "request local store" and the "sub-set local store" instructions it can be seen that the nested entry of the dump-stack is used to hold the locally created capability descriptor and that the local capability count register will indicate the number of local capabilities created during the running of the routine. In the case of the sub-set local store instruction bit 23 of the base entry is marked as a "1".

The nested area of the process dump-stack is used, in addition to providing a local capability descriptor table, to provide storage for registers to be preserved when a domain switch (i.e. a call to another sub-routine) occurs. The instructions involved are (a) the "Protected Call" instruction and (b) the "Protected Return" instruction.

The Protected Call Instruction

Figure 9:
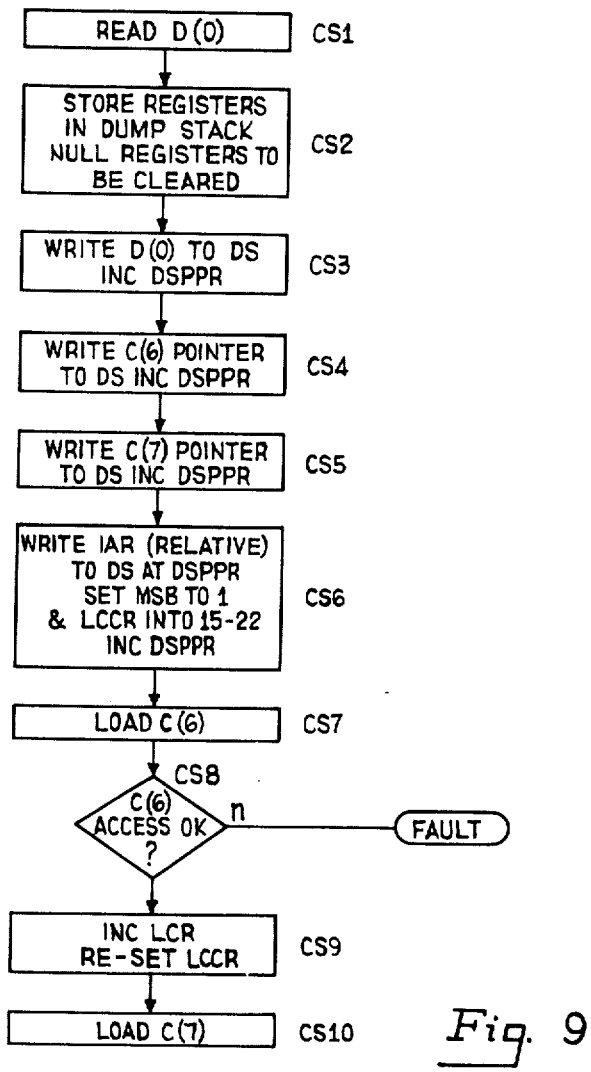

The flow diagram for the operations performed in the execution of this instruction are shown in FIG. 9. When this instruction is entered D(0) carries a register descriptor which (a) in the 12 most significant bits defines the registers to be stored in the dump-stack and (b) in the twelve least significant bits define the registers to be nulled. Typically a one in any of bits 12 to 17 defines the data registers D(1) to D(6) while bits 18 to 23 defines the pointers for capability registers C(0) to C(S) to be stored. Also a one in any of bits 0 to 5 define the data registers D(1) to D(6) to be nulled and bits 6 to 11 defines the capability registers to be nulled.

Step SC1—Read D(0)

In this step the contents of register D(0) is read and passed to the micro-program unit using the arithmetic unit condition signals ALUCS.

Step SC2—Store Registers; NULL REGISTERS

In this step the registers to be saved will be passed through the ALU to the store on successive store write operations at the successive locations in the link section of the dump-stack, as shown in FIG. 5. The addressing will be under the control of addresses formed using the dump-stack pushdown pointer in register DSPPR. When the saving of the registers has been completed the registers to be nulled and handled by circulating them through the ALU and zeroizing the ALU output.

Step CS3 Write D(0) to DS

When step CS3 is complete the dump-stack pushdown pointer will be pointing to the entry below the last register stacked. Reference to FIG. 5 shows that this location is used to hold the registers descriptor entry. The DSPPR register is used to define the dumpstack address into which the contents of D(0) are written.

```
ALU := DSPPR
MAR := ALU
ALU := D(0)
MDOR := ALU
Store Write @ MAR
ALU := DSPPR
ALU add 1
DSPPR := ALU
```

After the store write operation is performed in step CS3 the dump-stack pushdown pointer is incremented by one ready for the storage of the pointers for C(6) and C(7) in steps CS4 and CS5 with the consequent increment of the pushdown pointer.

Step CS6 Write IAR to DS

In this step the final entry for the nested routine is prepared it consists, in bits 0 to 15, of the relativised IAR value and, in bits 16 to 22, the value of the local capability count register which was incremented on the performance of step S10 in a "Request Local Store" instruction and step SS9 in a "Sub-set Local Store" instruction. The operations performed are typically as follows:

```
ALUa := IAR
ALUb := C(7) BASE
ALU Subtract and add 1
MDOR bits 0-15 := ALU bits 0-15
ALU := LCCR
MDOR bits 16-22 := ALU bits 16-22
ALU SET bit 23 to 1
MDOR bits 25 := ALU bit 23
Store Write @ MAR
ALU := DSPPR
ALU+1
DSPPR1 := ALU
```

Step CS7 LOAD C(6)

In this step the capability register C(6) is loaded with the capability descriptor for the capability pointer table for the called process.

Step CS8 C(6) ACCESS OK?

In this step the micro-program unit checks the Access code loaded in Step CS7.

Step CS9 INC LCR; RESET LCCR

In this step the value in the level number register LNR is incremented by one by passing this value through the ALU and local capability count value in register LCCR is reset to zero.

Step CS10 LOAD C(7)

In this step the program block capability register C(7) is loaded using the pointer defined by the A and M fields referencing the process capability table defined by register C(6).

This operation completes the functions for the protected call and it can be seen that the nested link includes the local capability descriptors created during the nested routine together with the saved registers and the descriptors for the local capability descriptors and the saved registers.

Figure 10:
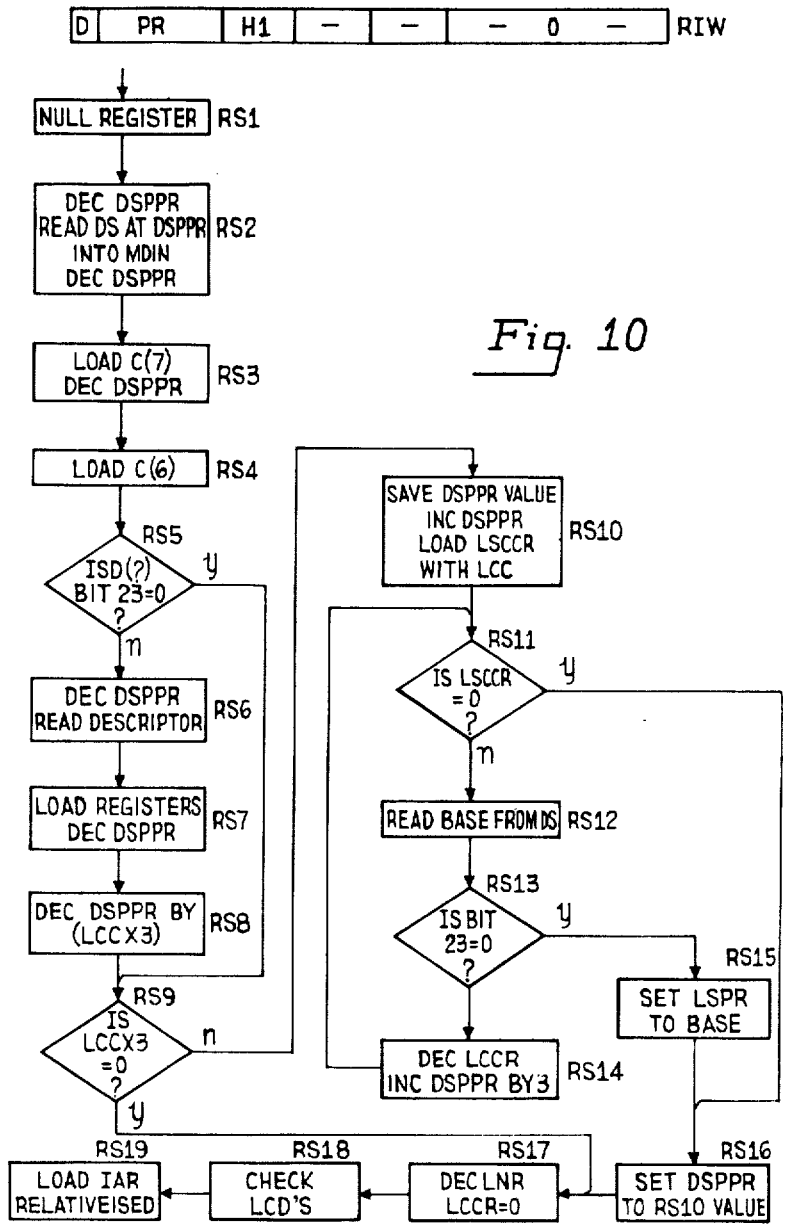
FIG. 10 shows the flow diagram of a protected return instruction.

Finally consideration will be given to the performance of a "Protected Return" instruction which will be performed at the end of a called routine to return control to the previously nested routine. FIG. 10 shows the operations performed for a protected return instruction.

Protected Return Instruction

The instruction word RIW shown at the top of FIG. 10 indicates that it operates in direct mode and it is entered with D(0) having in its least significant 12 bits a pattern of ones indicates the general purpose data D(1) to D(6) and capability registers C(0) to C(5) which are to be nulled.

Step RS1—NULL REGISTERS

In this step the register D(0) is read and used to condition the ALUCS signals so that the micro-program control can sequentially select the registers to be nulled by circulating their contents through the ALU.

Step RS2—READ DS

In this step the dump-stack is addressed at the dump-stack pushdown pointer, decremented by one, to address the descriptor/IAR link entry and the information read is fed into one of the internal data registers, say D(1), so that bit 23 can be tested in step RS5 to see if any registers require to be unloaded from the link.

```
ALU := DSPPR
ALU – 1
MAR := ALU
DSPPR := ALU
STORE READ @ MAR
MDIN := BII
ALU := MDIN
D(1) := ALU
ALU := DSPPR
ALU – 1
MAR := ALU
DSPPR := ALU
```

Step RS3 LOAD C(7); DEC DSPPR

In this step the pointer for C(7) is read from the dump-stack and capability register C(7) is loaded and the dump-stack pushdown pointer is decremented.

Step RS3 LOAD C(6)

In this step the pointer for C(6) is read from the dump-stack and the capability register C(6) is loaded.

Step RS5 IS Register Descriptor Bit 23 – 1?

In this step bit 23 of register D(1), loaded in step RS2 above, is tested. If it is 0 there are no stacked registers to be unloaded from the dump-stack link, typified by link LK(0) in FIG. 5, and steps RS6, RS7 and RS8 are by passed. If the tested bit is a one then these steps are performed to unload the stacked registers from the link.

Step RS6 DEC DSPPR; READ REG DESCRIPTOR

In this step the next entry in the link is read which from reference to FIG. 5 is the register descriptor and this descriptor is used in step RS7 to control the unloading of the stacked data and capability registers.

Step RS7 DEC DEPPR by (LCC×3)

This step adjusts the dump-stack pushdown pointer ready for unloading the local capability descriptors if there are any.

Step RS9 IS LCC×3=0

If it is zero there are no local capability descriptors in the link, such as that shown as LK(RS) in FIG. 5. If the value tested is not zero steps RS10 etc. will be performed to set the local store pointer to the base address of the first sub-set of the capability descriptor created by the routine being "un-nested".

Step RS10—SAVE DSPPR; INC DSPPR; LOAD LSCCR with LCCX3

In this step the dump-stack pushdown pointer in register DSPPR is saved for use later, typically it will be held in one of the data registers not loaded during steps RS6, RS7 and RS8. In addition the local store capability count register LCCR is loaded with the local capability count defining the number of local capabilities created by this process.

Step RS11—ISLSCCR=0?

In this step the local capability count is tested to see if it is zero. Obviously at this point in time the local capability count will not be zero.

Step RS12 READ BASE ENTRY

In this step the dump-stack link entry is read at the location defined in step RS10 so that the most significant bit of this word can be tested to see if it is a sub-set local capability base entry.

Step RS13—IS BIT 23=0

In this step the dump-stack entry read in the last step is tested to see if it is a local capability descriptor base entry as indicated by bit 23 being "1". If bit 23 is "1" step RS14 is performed.

Step RS14—DEC LCCR; INC DSPPR by 3

In this step the local capability count in register LCCR is decremented by one and the dump-stack pointer register is adjusted by three to point to the base entry of the next local sub-set capability pointer if there is one. Step RS11, RS12 and RS13 are then performed testing to see if there is another local capability descriptor (step RS11) and if it was created in the execution of the process being returned to (steps RS12 and RS11).

If no local sub-set capability descriptors have been created step RS16 is performed setting the dump-stack pushdown pointer value to the start of the dump-stack link which has been unloaded so that this area can be used again on the next "call" instruction. If a local sub-set capability descriptor has been found during the un-stacking of the returned to routine's parameters then step RS15 is performed setting the local store pointer register LSPR to the base value of that entry before performing step RS16.

Step RS14—DEC LNR; Zeroise LCCR

In this step the level number registers LNR is decremented by one as the return instruction is returning control to the higher level sub-routine and the local capability count register LCCR used in the loop involving step RS11, RS12, RS13 and RS14 is restored to zero.

Step RS18—CHECK LDS's

In this step the eight general purpose capability pointers for capability registers C(0) to C(5) are checked for local store capability access codes. If any are found with an offset value greater than or equal to the relative process dump-stack pushdown pointer value then corresponding capability register is pulled.

Step RS19—Load IAR

In this step the relativised IAR value stored in step RS2 is used to form the real IAR value for the routine returned-to.

From the above it can be seen that the protected return instruction removes all the stacked register values save when the call to the lower level sub-routine was made from the dump-stack link and causes the level number register LNR to be set to the next higher level and the dump-stack and local store pointer registers to be adjusted before returning to the next higher level sub-routine.

Conclusion

From the foregoing description it will be seen that the dump-stack is used to nest sub-routines with each link holding the pointers for capability registers C(6) and C(7) (i.e. the process capability table and the process program code block) and the relativised instruction address value from the nested routine together with the local store capability descriptor for any local store block created during the routine being nested together with a selection of the general purpose registers and the pointers for the general purpose capability registers. The information held in each link is qualified by a descriptor indicating the number of local capability descriptors created and the registers stacked. The instructions incorporated in the CPU to handle the enhanced dump-stack facilities are (i) the request local store and sub-set local store instructions which partition the local store block and allocate capability descriptors for them storing the descriptors in the link area of the dump-stack relevant to the sub-routine requesting the local store block and (ii) protected call and return instructions which respectively cause the nesting and un-nesting of sub-routines with the stacking and unstacking of selected register contents in the nested links. It will also be appreciated that while the local store is allocated by explicit instruction it is deallocated automatically when return is made from the sub-routine in whose link the local store capability descriptor entry is made. Hence all capabilities of a specific level become inactive when the procedure level is returned from and this includes capabilities in registers. The level number associated with each local store capability entry is to enforce the non-discretionary propagation control mechanism. This mechanism ensures that no capability descriptor can be stored and used in a lower level sub-routine. This security mechanism is vital to prevent capability descriptors being left referring to non-existant or worse superceded information after a return to a higher level sub-routine is made.

What we claim is:

1. A multi-user data processing system including a processor module for executing a plurality of processes which perform nested subroutines, each of said plurality of processes being provided with a discrete process dump-stack having a fixed area of storage elements for the storage of the content of machine registers and indicators when the process is suspended; and a variable area of storage elements for the storage of a link for each nested subroutine performed by the process, each link including (i) an instruction address to which a process is to return when the nested subroutine is to be recommenced; and (ii) a pointer to a code block of the nested subroutine wherein said code block defines the instructions of the nested subroutine, said processes capable of generating a request local store instruction, the improvement comprising:

means in said processor module for executing said request local store instruction;

in a link of said variable area of storage elements of said process dump-stack, an indicator defining the size and contents of a remainder of the link and a block of local storage area which is divided into a plurality of local storage segments, said local storage segments being used for local storage of information pertaining to said nested subroutine when suspended during the execution of said request local store instruction;

said processor module including a local store stack pointer register and a local store clear count register, said local store stack pointer register containing the starting address of a free area in the local storage segment and said local store clear count register containing the available size of an area in a local store block free for storage, the contents of said local store stack pointer register and said local store clear count register being altered by said processor module, the registers being affected by the allocation of said local storage segments during the execution of said request local store instruction; and said processor module further including means to access said local store stack pointer register and local store clear count register and including means for generating local capability descriptor information for storage in the variable portion of the process dump-stack during the execution of said request local store instruction.

2. A processing system as claimed in claim 1 in which the request local store instruction uses a local store capability register in the processor module which contains information indicative of the area of the store of the data processing system occupied by the block of local storage allocated to the process being performed by the processor module.

3. A processing system as claimed in claim 2 in which the link descriptor includes information indicative of the number of local storage segments created during the performance of the subroutine.

4. A processing system as claimed in claim 2 in which the link descriptor includes a tag which when marked indicates that the link includes storage locations storing the contents of at least one general purpose data and capability register of the processor module.

5. A processing system as claimed in claim 4 in which the link also includes a register stacked descriptor which indicates the identities of the general purpose data and capability register contents which have been stored in the link.

6. A processing system as claimed in claim 2 in which the processor module includes a sub-set local store instruction which controls the segregation of a local store segment into smaller sub-sets and the operation of the sub-step local store instruction includes a step of making a portion of an entry in the link with at least one flag bit to indicate that the entry relates to a sub-set of a local store segment.

7. A processing system as claimed in claim 6 in which each entry created by a request local store instruction or a sub-step local store instruction records a level number allocated to the subroutine being performed when the local store segment or sub-set was created.

* * * * *